United States Patent [19]
Labrash

[11] Patent Number: 5,639,140
[45] Date of Patent: Jun. 17, 1997

[54] HOOK RETAINER FOR A VEHICLE TRIM PANEL

[75] Inventor: Carl Leroy Labrash, Shelby Township, Mich.

[73] Assignee: General Motors Corporation, Detroit, Mich.

[21] Appl. No.: 609,709

[22] Filed: Mar. 1, 1996

[51] Int. Cl.$^6$ .................................................. B60R 27/00
[52] U.S. Cl. .................. 296/39.1; 181/150; 248/222.11; 403/315
[58] Field of Search ........................ 296/39.1, 146.7; 181/150; 248/27.3, 222.11; 403/326, 329, 315, 316, 319

[56] References Cited

U.S. PATENT DOCUMENTS

| | | | |
|---|---|---|---|
| 1,629,603 | 5/1927 | Vodicka. | |
| 2,096,387 | 10/1937 | Tinnerman | 29/148 |
| 2,135,417 | 11/1938 | Tinnerman | 29/148 |
| 2,274,482 | 2/1942 | Jones | 24/73 |
| 3,068,030 | 12/1962 | Ransom | 403/329 |
| 3,614,815 | 10/1971 | Nysten | 24/216 |
| 4,356,987 | 11/1982 | Schmid | 248/73 |
| 4,424,881 | 1/1984 | Hattori | 181/150 |
| 4,641,401 | 2/1987 | Hasegawa | 24/681 |
| 4,934,480 | 6/1990 | Gaté et al. | 181/150 |
| 5,226,809 | 7/1993 | Franco | 24/704.1 |
| 5,411,310 | 5/1995 | Viertel et al. | 296/97.9 |
| 5,416,283 | 5/1995 | Dault et al. | 181/150 |
| 5,565,659 | 10/1996 | Moner et al. | 181/150 |

*Primary Examiner*—Gary C. Hoge
*Attorney, Agent, or Firm*—Charles E. Leahy

[57] ABSTRACT

An insert panel is installed within an opening of a trim panel. The insert panel has at least one integrally molded flexible hook member for yieldably hooking onto the walls of the opening to retain the insert panel within the opening. A retainer tab is formed integral with the trim panel and extends into the opening to underlie a portion of the insert panel. The retainer tab has a flexible finger extending into proximity with the hook member to block the hook member against movement in the direction to unhook from the wall of the opening. The insert panel may be removed from the trim panel by resiliently flexing the retainer tab to unblock the hook member so that the hook member can be unhooked from the wall.

2 Claims, 2 Drawing Sheets

HOOK RETAINER FOR A VEHICLE TRIM PANEL

The invention relates to hooking an insert panel into an opening of a vehicle trim panel, and more particularly, provides integral retainer tabs on the trim panel for blocking the unhooking of the insert panel from the trim panel.

BACKGROUND OF THE INVENTION

It is well known in motor vehicles to trim the interior surfaces of the vehicle by securing molded plastic trim panels onto the underlying sheet metal structure of the vehicle body.

These trim panels are relatively large and subject to substantial flexure during their installation into the vehicle body.

It is well known to provide openings in the plastic vehicle trim panel to mount an insert panel. For example, the insert panel may be a cover for concealing a radio speaker. The insert panel is also molded of a flexible plastic material and conventionally includes integrally molded flexible hook members which snap fit onto the walls of the opening in the trim panel.

A shortcoming of the aforedescribed attachment of the insert panel onto the trim panel is that the flexure of the trim panel may cause the insert panel to become unhooked from the trim panel.

The present invention provides an integral retainer tab formed on the trim panel for retaining the hook member in the hooked condition.

SUMMARY OF THE INVENTION

According to the invention, an insert panel is installed within an opening of a trim panel. The insert panel has at least one integrally molded flexible hook member for yieldably hooking onto the walls of the opening to retain the insert panel within the opening. A retainer tab is formed integral with the trim panel and extends into the opening to underlie a portion of the insert panel. The retainer tab has a flexible finger extending into proximity with the hook member to block the hook member against movement in the direction to unhook from the wall of the opening. The insert panel may be removed from the trim panel by resiliently flexing the retainer tab to unblock the hook member so that the hook member can be unhooked from the wall.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
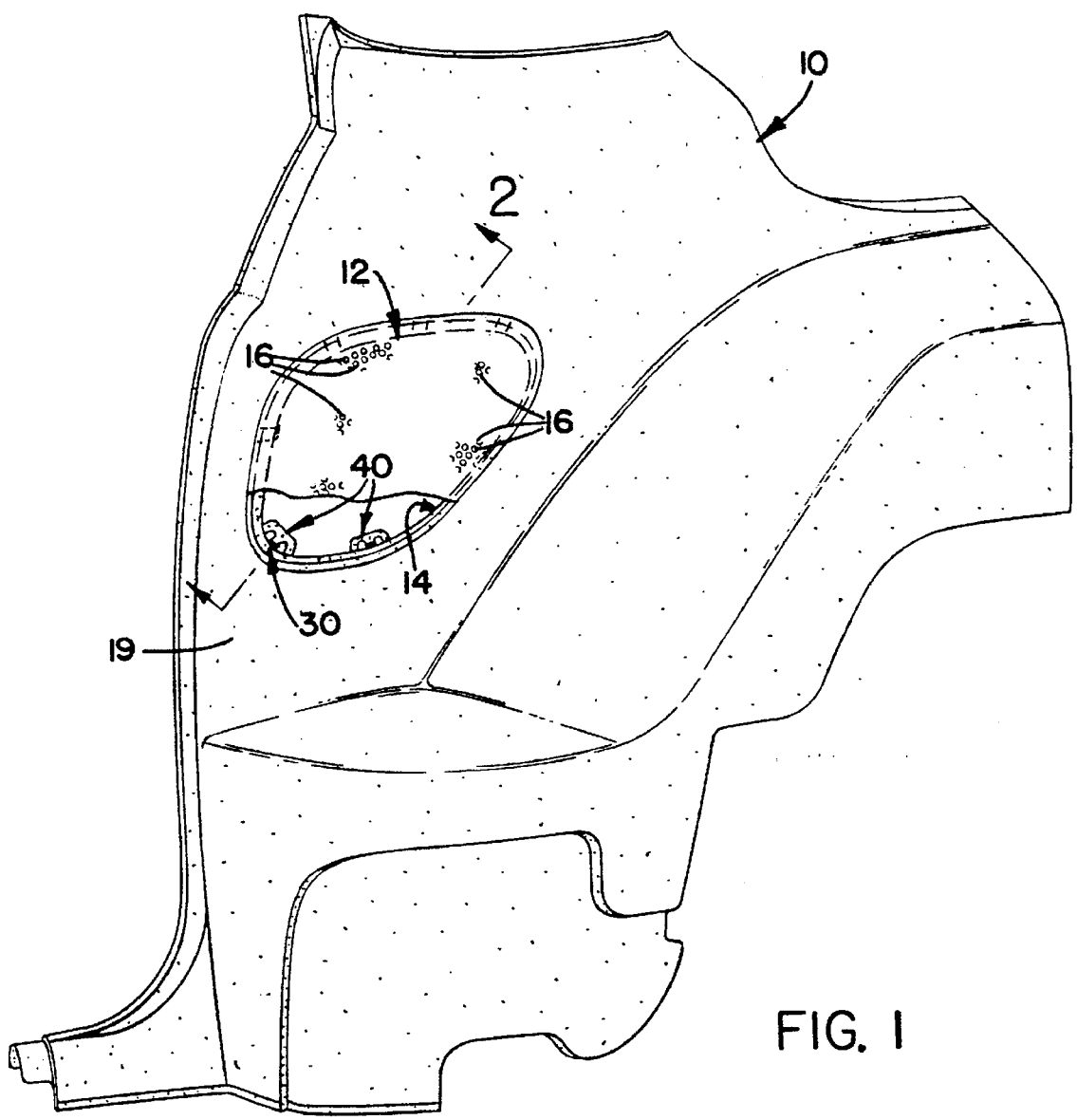
FIG. 1 is a perspective view of a interior trim panel for a vehicle body having a radio speaker cover installed therein according to the invention.

Referring to FIG. 1, a vehicle trim panel 10 is a relatively large and flexible molding of plastic material which is shaped to define the interior surface of the vehicle compartment. The trim panel 10 will be installed in a vehicle body and suitably attached to the underlying metal structure of the vehicle body by suitable fasteners, not shown. As seen in FIG. 1, an insert panel 12 in the form of a radio speaker cover, is installed within an opening 14 of the trim panel 10.

Figure 2:
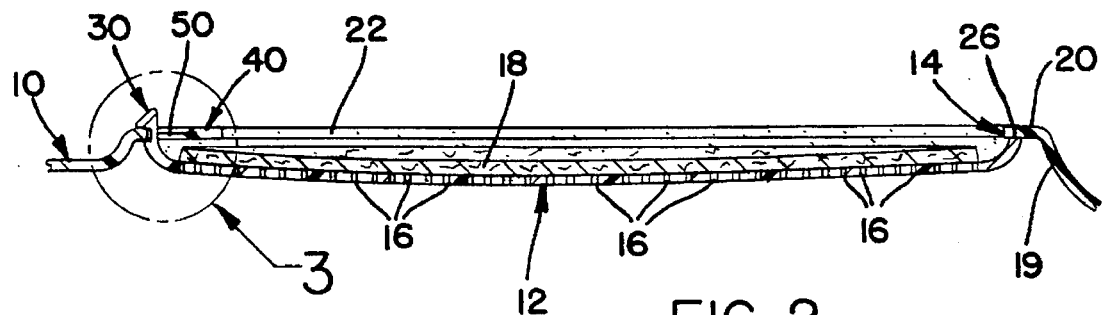
FIG. 2 is a section view taken in the direction of arrows 2—2 of FIG. 1.

Referring to FIG. 2, it is seen that the insert panel 12 includes has a plurality of holes 16 therein and is backed by a layer of porous cloth 18 so that the sound emanating from a radio speaker mounted on the body behind the trim panel 10 can readily transmit into the passenger compartment.

As seen in FIG. 2, the opening 14 of the trim panel 10 is defined by an inner wall 19 of the trim panel, outer wall 20 of the trim panel, and an edge wall 22 of the trim panel. The edge wall 22 is recessed at a recess pocket 24 to be discussed hereinafter. The insert panel 12 has an edge portion 26 which rests upon the inner wall 19 of the trim panel 10 to establish the installed position of the insert panel 12 in the in and out direction.

Figure 3:
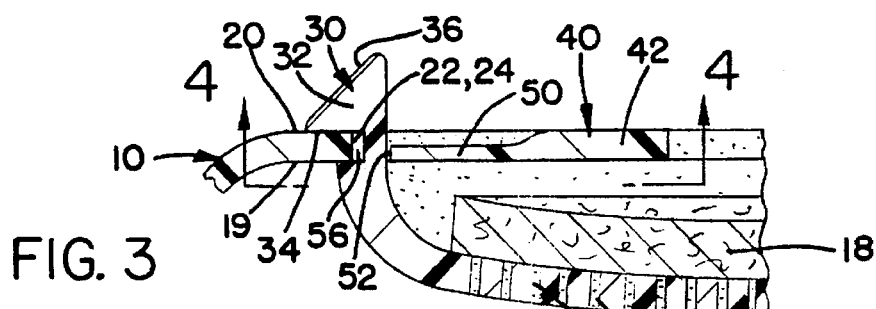
FIG. 3 is an enlarged view of FIG. 2 showing the hook member and retainer tab.
Figure 4:
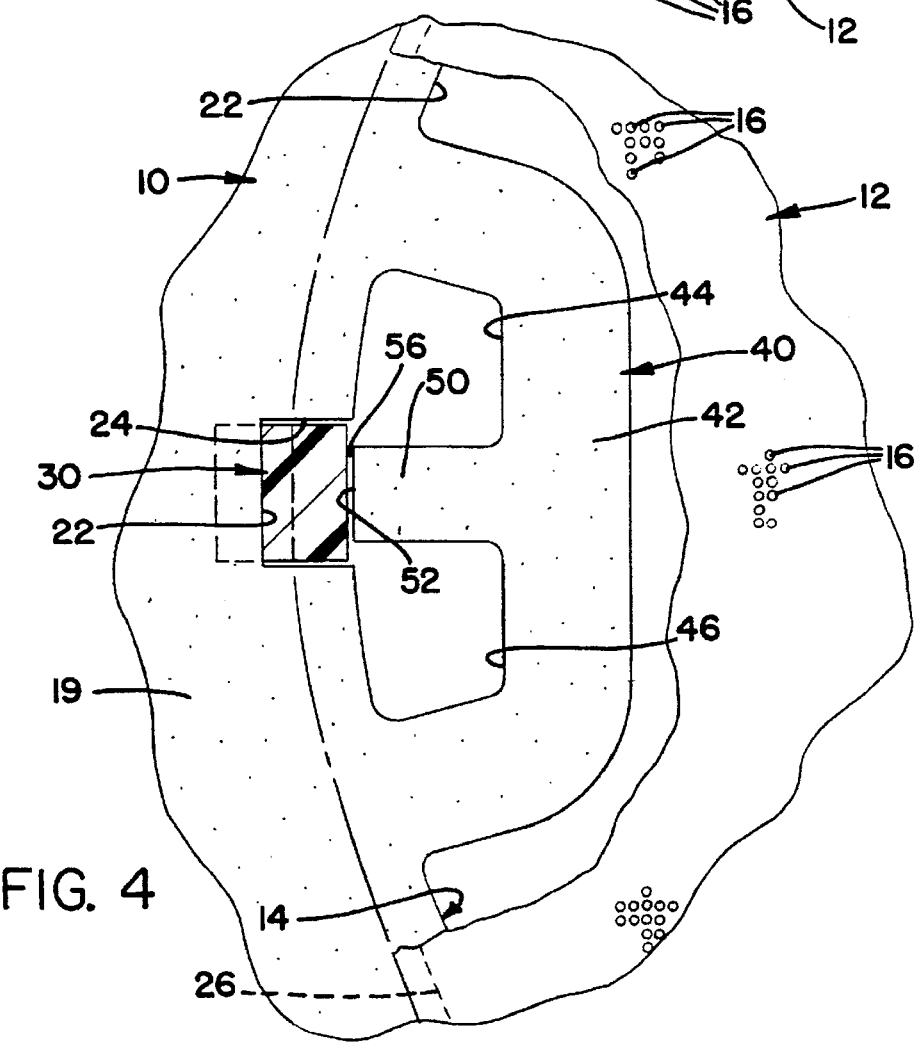
FIG. 4 is a view taken in the direction of arrows 4—4 of FIG. 3.
Figure 5:
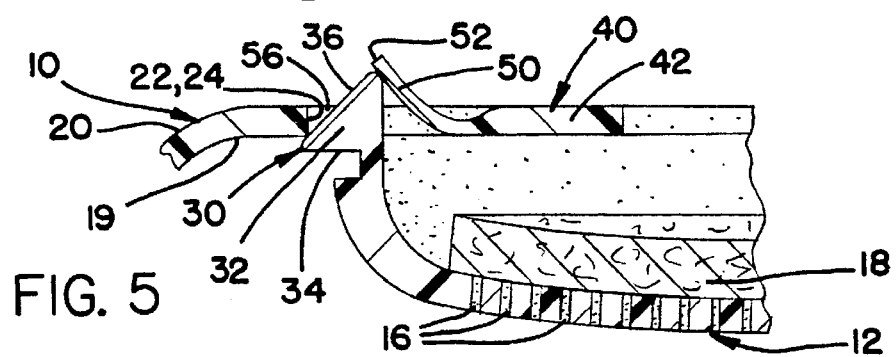
FIG. 5 shows the hook member during its installation into engagement within the opening of the trim panel.

As best seen in FIGS. 3, 4 and 5, the insert panel 12 is retained within the opening 14 of the trim panel 10 by one or more hook members 30 which are molded integral with the edge portion 26 of the insert panel 12. The hook member 30 includes an enlarged head portion 32, a hook surface 34 and a chamfer 36. As seen in FIG. 5, the insert panel 12 is installed into the opening 14 of the insert panel 10 by pressing the insert panel into the opening so that the chamfer surface 36 becomes engaged with the juncture between the inner wall 19 and the edge wall 22 of the recess pocket 24 of opening 14 to yieldably flex the hook member 30, thereby permitting the insert panel 12 to come into rest by permitting the edge portion 26 of the cover 12 to come into engagement with the inner surface of wall 19 of the trim panel 10. The hook member 30 then springs into its position of FIG. 3 in which the hook surface 34 is engaged with the outer surface 20 of trim panel 10, thereby retaining the insert panel 12 on the trim panel 10.

The recess pocket 24 is not necessary, but desirable, as it receives the hook member 30 to assist in locating the insert panel within the opening Although only one hook member is shown in the drawings, it is preferred that several such hook members be employed at intervals around the opening.

According to the present invention, a retainer tab, generally indicated at 40, is provided to block the hook member 30 at its engaged position of FIG. 3 so that the trim panel 12 will not become disengaged from the panel 10 upon flexure of one of the panels. As seen in FIG. 4, the retainer tab 40 is provided by an integrally molded extension portion 42 of the insert panel 10 which extends inwardly into the opening 14 to underlie a portion of the insert panel 12. Extension portion 42 is cut out at openings 44 and 46 on either side of the hook member 30 to define a flexible finger 50 which extends into close proximity with the hook member 30 and has an edge end face 52 which is spaced somewhat from the edge face 22 of the opening 14 in the trim panel 10 to define a passage space 56 therebetween. This passage space is appreciably less than the dimension of the head 32 of the hook member 30.

As best seen in FIG. 5, the insertion of the hook member 30 into the opening 14 causes the head portion 32 to engage with the flexible finger 50 and flex the flexible finger 50 upwardly to permit the entry of the hook member head portion 32 through the limited passage 56. Then, as seen in FIG. 3, upon full entry of the hook member 30 into the opening and the resilient radial outward return of the hook member 30 into hooking engagement with the panel 10, the flexible finger 50 is self-returning to the position of FIG. 3 in which the end wall 52 thereof is closely spaced from the hook member 30 to thereby block the hook member against unhooking from the trim panel 10.

It will be understood that the insert panel 12 may be subsequently unhooked from the panel 10 by bending the flexible finger 50 downwardly from the condition shown in FIG. 3 in order to permit the hook member to be bent rightwardly and unhooked from the trim panel 10.

Thus, it is seen that the invention provides a new and improved retainer tab for blocking the inadvertent removal of a hooked-in-place insert panel from the vehicle trim panel.

I claim:

1. In a vehicle body trim panel having walls defining an opening therein and an insert panel adapted to be installed within the opening and having at least one integrally molded flexible hook member for yieldably hooking onto the walls of the opening to retain the insert panel within the opening and being subsequently yieldable to enable unhooking of the hook members from the trim panel; the improvement comprising:

a retainer tab formed integral with the trim panel and resiliently extending into proximity with the hook member to normally block the hook member against movement to unhook from the wall of the opening and being resiliently movable to unblock the hook member so that the hook member can be unhooked from the wall.

2. In a vehicle body trim panel having walls defining an opening therein and an insert panel adapted to be installed within the opening and having at least one integrally molded flexible hook member for yieldably hooking onto the walls of the opening to retain the insert panel within the opening and being subsequently yieldable to enable unhooking of the hook members from the trim panel; the improvement comprising:

a retainer tab formed integral with the trim panel and extending into the opening so that the retainer tab underlies the insert panel, said retainer tab having a flexible finger extending into close proximity with the wall of the opening to define therebetween a passage for the hook member, said hook member having a head of greater dimension than the passage so that the entry of the hook member into engagement with the wall causes the head to flexibly urge the flexible finger out of the way to permit hooking of the hook member onto the wall, and the resilience of the flexible leg causing the flexible leg to engage with the hook member to normally block the hook member against movement to unhook from the wall of the opening and being resiliently movable to unblock the hook member so that the hook member can be unhooked from the wall.

* * * * *